US009164509B2

(12) United States Patent
Kim et al.

(10) Patent No.: US 9,164,509 B2
(45) Date of Patent: Oct. 20, 2015

(54) MOBILE ROBOT AND METHOD OF LOCALIZATION AND MAPPING OF THE SAME

(71) Applicants: SAMSUNG ELECTRONICS CO., LTD., Suwon-si, Gyeonggi-do (KR); KOREA ADVANCED INSTITUTE OF SCIENCE AND TECHNOLOGY, Daejeon (KR)

(72) Inventors: In Joo Kim, Suwon-si (KR); Seung Mok Lee, Daejeon (KR); Shin Kim, Hwaseong-si (KR); Hyeon Myeong, Daejeon (KR); Byeol Teo Park, Daejeon (KR); Ji Eun Park, Ansan-si (KR); Jong Dae Jung, Daejeon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 40 days.

(21) Appl. No.: 14/190,761

(22) Filed: Feb. 26, 2014

(65) Prior Publication Data

US 2014/0244094 A1 Aug. 28, 2014

(30) Foreign Application Priority Data

Feb. 28, 2013 (KR) .................. 10-2013-0022466

(51) Int. Cl.
*G05D 1/02* (2006.01)
(52) U.S. Cl.
CPC .............. *G05D 1/021* (2013.01); *G05D 1/0272* (2013.01)

(58) Field of Classification Search
CPC ..... G05D 1/021; G05D 1/0272; A61N 1/406; A61N 7/00; A61F 2/82; G06F 17/30241; G06F 17/00; G06F 19/3456
See application file for complete search history.

(56) References Cited

U.S. PATENT DOCUMENTS

| | | | |
|---|---|---|---|
| 5,956,465 A * | 9/1999 | Takagi et al. ................. 700/255 |
| 2005/0159879 A1* | 7/2005 | De Graeve et al. ........... 701/200 |
| 2008/0195261 A1* | 8/2008 | Breed ............................... 701/2 |
| 2011/0200265 A1* | 8/2011 | Prigent ......................... 382/248 |
| 2012/0035434 A1* | 2/2012 | Ferren et al. ................. 600/301 |
| 2012/0035437 A1* | 2/2012 | Ferren et al. ................. 600/302 |
| 2013/0151009 A1* | 6/2013 | Okazaki ....................... 700/260 |
| 2013/0204430 A1* | 8/2013 | Davey et al. ................. 700/216 |
| 2013/0247117 A1* | 9/2013 | Yamada et al. ................. 725/93 |
| 2013/0303847 A1* | 11/2013 | Sitti et al. ..................... 600/104 |
| 2014/0244094 A1* | 8/2014 | Kim et al. ...................... 701/23 |

* cited by examiner

*Primary Examiner* — James Trammell
*Assistant Examiner* — James E Stroud
(74) *Attorney, Agent, or Firm* — Staas & Halsey LLP

(57) ABSTRACT

A method of localization and mapping of a mobile robot may reduce position errors in localization and mapping using a plurality of vector field sensors. The method includes acquiring a relative coordinate in a movement space using an encoder, acquiring an absolute coordinate in the movement space by detecting intensity and direction of a signal using vector field sensors, defining a plurality of virtual cells on a surface of the movement space such that each of the cells has a plurality of nodes having predetermined positions, and updating position information about the nodes of the cells based on the relative coordinate acquired through the encoder and the absolute coordinate acquired through the vector field sensors and implementing localization and mapping in the movement space in a manner that position information of a new node is estimated while position information of a previous node is determined.

28 Claims, 10 Drawing Sheets

(a)

(b)

MOBILE ROBOT AND METHOD OF LOCALIZATION AND MAPPING OF THE SAME

CROSS-REFERENCE TO RELATED APPLICATIONS

This application claims the benefit of Korean Patent Application No. 10-2013-0022466, filed on Feb. 28, 2013 in the Korean Intellectual Property Office, the disclosure of which is incorporated herein by reference.

BACKGROUND

1. Field

One or more embodiments relate to a method of localization and mapping of a mobile robot.

2. Description of the Related Art

Simultaneous localization and mapping (SLAM), a localization and mapping technique of a mobile robot, may be classified into two major categories. The first is recognition of the position of the mobile robot in an environment containing a specific indicator (e.g., a landmark or a beacon) recognizable by the mobile robot. The second is recognition of the position of the mobile robot in a general environment containing no specific indicator. In the case of the second category, various sensors are used to recognize the position in an environment containing no specific indicator. Representative sensing techniques used in this case include techniques of utilizing images, lasers, and ultrasound. These sensing techniques have been conventionally utilized to find landmarks distinct from other positions and discretely create the same to recognize the position of the mobile robot. Recently, research has been conducted into utilization of a continuous vector field, which is an extension of discrete landmarks, to reduce errors in localization and mapping.

However, in the case that a vector field is created using a single sensor to utilize the vector field, movement of the mobile robot around a cell configuring the vector field or along the boundary of the cell may result in insufficient updating of the information about the nodes (the boundary of the cell). Thereby, position errors may not be reduced. Particularly, when the mobile robot moves at a high speed, the errors may be worsened.

SUMMARY

The foregoing described problems may be overcome and/or other aspects may be achieved by one or more embodiments of a method of localization and mapping of a mobile robot that may greatly reduce position errors in localization and mapping by compensating for a cumulative error of a relative coordinate using a plurality of vector field sensors.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a method of localization and mapping of a mobile robot may include acquiring a relative coordinate in a movement space using an encoder, acquiring an absolute coordinate in the movement space by detecting at least one of intensity and direction of a signal using a plurality of vector field sensors, defining a plurality of virtual cells on a surface of the movement space such that each of the cells has a plurality of nodes having predetermined positions, and updating position information about the nodes of at least one of the cells based on the relative coordinate acquired through the encoder and the absolute coordinate acquired through the vector field sensors and implementing localization and mapping in the movement space such that position information of a new node may be estimated while position information of a previous node is determined.

The updating may be performed when the mobile robot is positioned in one of the cells.

The method may further include calculating and applying a weight for each of the nodes when the mobile robot is positioned in one of the cells.

The method may further include initializing a node connected to another node to be extended when the mobile robot moves from one of the cells to another one of the cells.

The initializing may be performed based on a mean value and a covariance value of the connected node.

The localization and mapping may be performed by applying fast simultaneous localization and mapping (SLAM).

The method may further include compensating for an error of the relative coordinate acquired through the encoder using the absolute coordinate acquired through the vector field sensors.

The relative coordinate may be an odometry coordinate including an x coordinate, a y coordinate and an angle of travel direction of the mobile robot.

The cells may have a continuity therebetween.

The nodes configuring each of the cells have a continuity therebetween.

Each of the vector field sensors may be a magnetic field sensor.

Each of the vector field sensors may be a Wi-Fi received signal strength indicator.

Each of the vector field sensors may be an FM receiver.

At least two of the vector field sensors may be arranged at a front and back of the mobile robot in a travel direction of the mobile robot.

In accordance with one or more embodiments, a mobile robot may include an encoder to acquire a relative coordinate in a movement space, a plurality of vector field sensors to acquire an absolute coordinate in the movement space by detecting at least one of intensity and direction of a signal using a plurality of vector field sensors, and a controller to define a plurality of virtual cells on a surface of the movement space such that each of the cells may have a plurality of nodes that may have predetermined positions and to update position information about the nodes of at least one of the cells based on the relative coordinate that may be acquired through the encoder and the absolute coordinate acquired through the vector field sensors and implement localization and mapping in the movement space such that position information of a new node may be estimated while position information of a previous node is determined.

The controller may update the position information about the nodes when the mobile robot is positioned in one of the cells.

The controller may calculate and apply a weight for each of the nodes when the mobile robot is positioned in one of the cells.

The controller may initialize a node connected to another node to be extended when the mobile robot moves from one of the cells to another one of the cells.

Initializing the connected node may be performed based on a mean value and a covariance value of the connected node.

The localization and mapping may be performed by applying fast simultaneous localization and mapping (SLAM).

The controller may compensate for an error of the relative coordinate acquired through the encoder using the absolute coordinate acquired through the vector field sensors.

The relative coordinate may be an odometry coordinate including an x-coordinate, a y-coordinate and an angle of travel direction of the mobile robot.

The cells may have a continuity therebetween.

The nodes configuring each of the cells may have a continuity therebetween.

Each of the vector field sensors may be a magnetic field sensor.

Each of the vector field sensors may be a Wi-Fi received signal strength indicator.

Each of the vector field sensors may be an FM receiver.

At least two of the vector field sensors may be arranged at a front and back of the mobile robot in a travel direction of the mobile robot.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
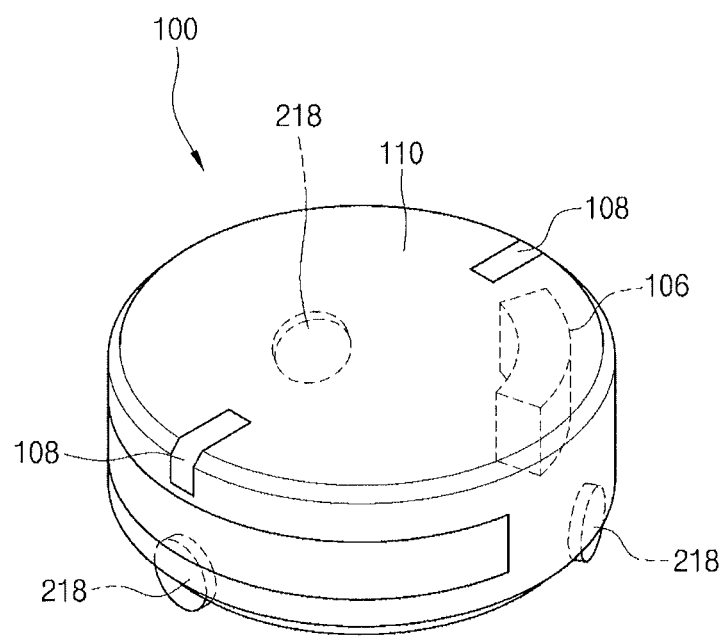
FIG. 1 is a view illustrating a mobile robot according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view illustrating a mobile robot according to one or more embodiments. The mobile robot 100 may perform cleaning by suctioning dust and debris on the floor using suction force that may be produced by a fan that may rotate inside the cleaner and/or static electricity that may be produced by a charging device while moving in an indoor space. The mobile robot 100 may be provided with a docking station (not shown) to charge the battery thereof and discharge dust and debris.

Electric wheels 218 may be installed at a lower portion of a robot body 110 to move the mobile robot 100. The electric wheels 218 may be driven by a drive motor (not shown), to cause the mobile robot 100 to move linearly and rotationally. In addition, an obstacle detector 106 such as, for example, an infrared sensor or an ultrasound sensor or the like may be installed to the outer side of the robot body 110 to possibly allow the mobile robot to avoid obstacles while moving around. A plurality of vector field sensors 108 may be arranged at an upper portion of the robot body 110. In a non-limiting example, in FIG. 1, two vector field sensors 108 are provided. However, the configuration of the mobile robot is not limited thereto. Hereinafter, it will be assumed that N vector field sensors 108 are provided for ease of mathematical description.

Figure 2:
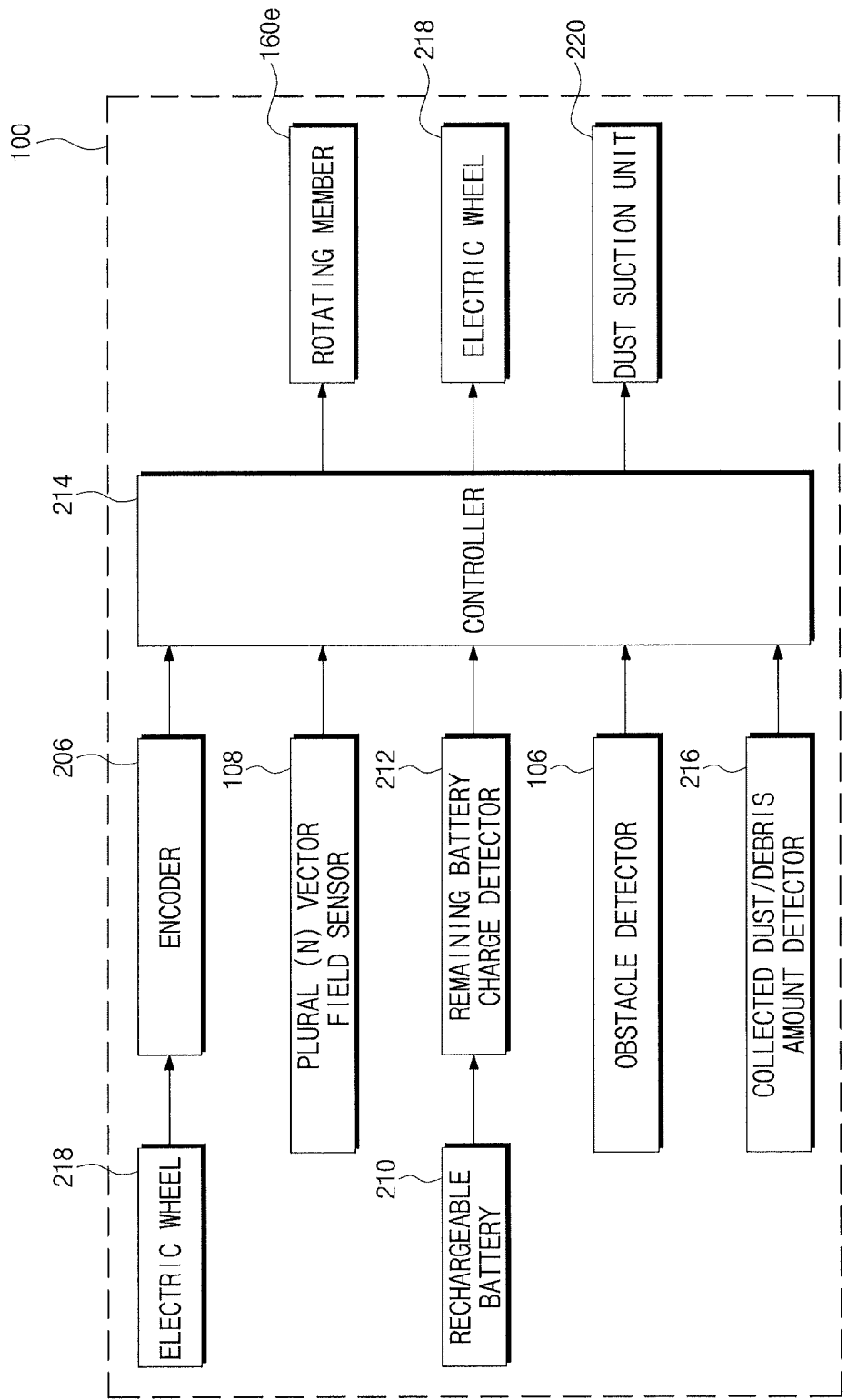
FIG. 2 is a block diagram illustrating a control system of a mobile robot according to one or more embodiments, such as the mobile robot shown in FIG. 1.

FIG. 2 is a block diagram illustrating a control system of a mobile robot according to one or more embodiments, such as the mobile robot shown in FIG. 1. As shown in FIG. 2, the control system of the mobile robot 100 may include a controller 214 to control overall operations of the mobile robot 100. An encoder 206 and a plurality of vector field sensors 108, a remaining battery charge detector 212, the obstacle detector 106, a collected dust/debris amount detector 216 may be electrically connected to the input side of the controller 214 to communicate with the controller 214. The encoder 206 may be a sensor to acquire relative coordinates of the mobile robot 100. The encoder 206 may detect the rate and direction of rotation of the electric wheels 218 of the mobile robot 100 and may transmit corresponding values to the controller 214. The rate and direction of rotation of the electric wheels 218 may be detected through the encoder 206 to find an odometry coordinate ($\Delta x$, $\Delta y$, $\Delta \theta$) of the mobile robot. The vector field sensors 108, which may be configured to find an absolute coordinate of the mobile robot 100, may detect the absolute position of the mobile robot 100 based on the intensity and direction of a specific signal around the mobile robot 100. Herein, the absolute position may be a position on a coordinate that may be determined by the intensity and direction of the specific signal. The mobile robot 100 may recognize its current position based on the position information that may be acquired through the encoder 206 and the vector field sensors 108, and may drive the electric wheels 218 to move to the destination. In this process, the controller 214 may implement mapping of the space in which the mobile robot 100 may be moving. The remaining battery charge detector 212 may detect the remaining charge of a rechargeable battery 210 and may provide information about the remaining charge to the controller 214. When it is determined that the remaining charge of the rechargeable battery 210 is insufficient and recharging is required, the controller 214 may stop operation of the mobile robot 100 that may be currently in progress, and may control the mobile robot 100 to return to the docking station to recharge the rechargeable battery 210. While the mobile robot 100 is moving, the obstacle detector 106 may detect an obstacle that may exist in front of the mobile robot 100 and may provide information about the obstacle to the controller 214. Based on the information about the obstacle, the controller 214 may change the travel path to possibly allow the mobile robot 100 to detour around the obstacle, thereby possibly preventing stopping of the mobile robot 100 due to the obstacle. The collected dust/debris amount detector 216 may detect the amount of dust and debris collected in the mobile robot 100 and may provide the information about the amount to the controller 214. The controller 214 may confirm the amount of dust and debris accumulated in the mobile robot 100 based on the information about the amount of collected dust and debris, and when the amount of the loaded dust and debris reaches a maximum loading amount bearable by the mobile robot 100, the controller 214 may control the mobile robot 100 to stop the cleaning operation and return to the docking station 102 to discharge the dust and debris.

A rotating member 160*e*, the electric wheels 218, and a dust suction unit 220 may be electrically connected to the output side of the controller 214 to communicate with the controller 214. The rotating member 160*e*, one of constituents of a receiver 160 may rotate antennas 160*a* to 160*d* on a certain track at a constant rate. The electric wheels 218 may move the mobile robot 100 and may include drive wheels for forward and backward movement and reorientation wheels for change of travel direction. The dust suction unit 220 may be arranged to face a lower portion of the mobile robot 100. Thereby, the dust suction unit 220 may suction dust and debris on the surface of a floor in an area to cleaned and may accumulate the same in a dust/debris accumulation space in the mobile robot 100.

The electric wheels 218 that may be configured with the drive wheels and reorientation wheels may allow the mobile robot 100 to rotate at a fixed position.

Figure 3:
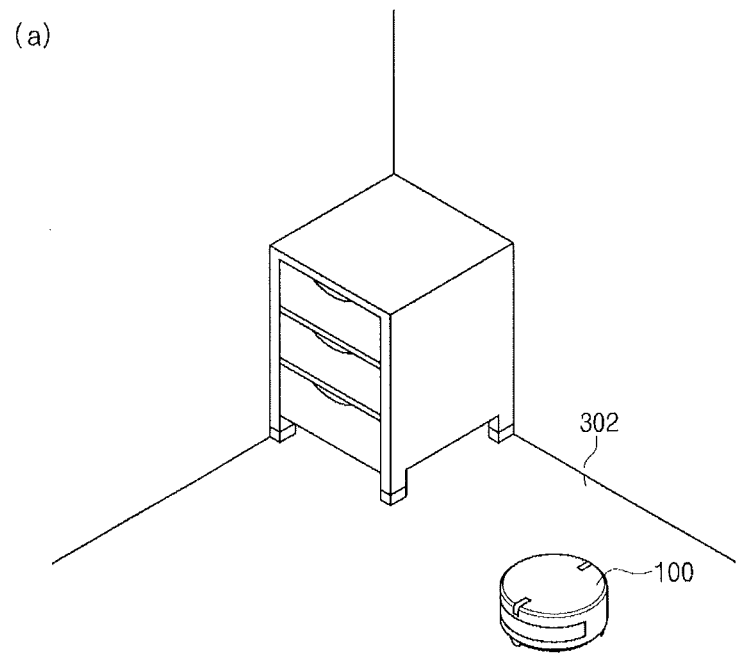
FIG. 3 is a view illustrating the movement space of a mobile robot according to one or more embodiments.
Figure 3:
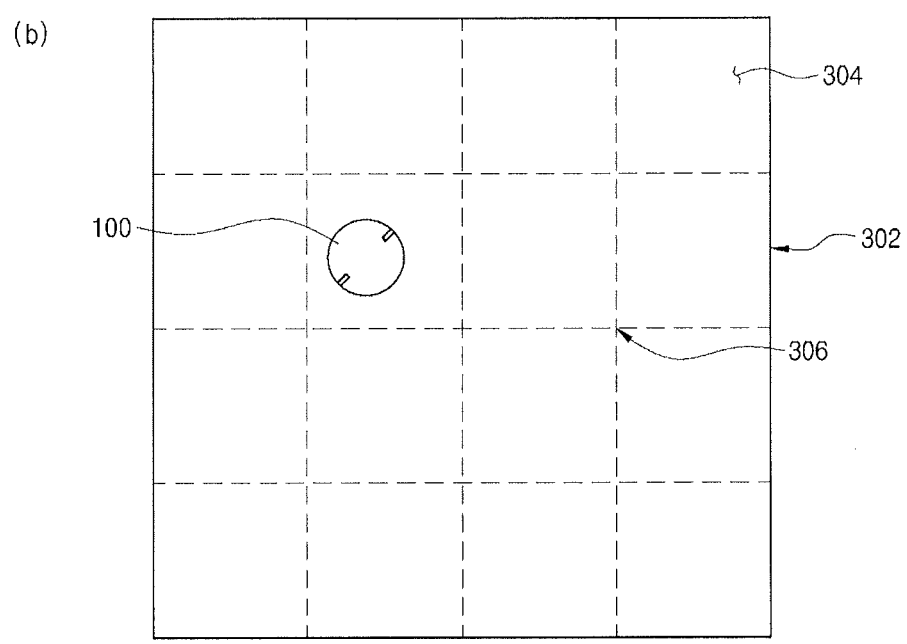

FIG. 3 is a view illustrating the movement space of a mobile robot according to one or more embodiments. As shown in FIG. 3 (*a*), the mobile robot 100 may move on a two-dimensional plane (e.g., a floor surface) 302. The mobile robot 100 may create a continuous (or periodic) vector field on the two-dimensional plane 302, and may compensate for the cumulative error of the electric wheel 218 in the odometry through detection of the vector field. That is, the electric wheels 218 may be provided with an encoder 206. An amount and rate of rotation of the electric wheels 218 may be detected through the encoder 206, but the measured values thereof may become unreliable as the travel distance of the mobile robot 100 increases since errors may be accumulated in the result of detection by the encoder 206. According to one or more embodiments, accurate localization and mapping of the mobile robot 100 may be improved by compensating for the cumulative error in the odometry by sensing absolute positions of the surroundings of the mobile robot 100 using the vector field sensors 108. FIG. 3(*b*) shows a plurality of cells 304 that may be virtually created on the two-dimensional plane 302. As shown in FIG. 3(B), when the mobile robot 100 moves, the virtual cells 304 may be continuously created on the two-dimensional plane. In a vector field covering the cells 304, the cells 304 may be continuously created with the same size. Accordingly, the distance between nodes 306 formed at the points at which the cells 304 met each other may be continuous and periodic.

According to this embodiment, the vector field sensors 108 of the mobile robot 100 may update the nodes 306 of the cells 304 during movement of the mobile robot 100. Since the information about the nodes 306 of the cells 304 may be updated using the vector field sensors 108 regardless of the point at which the mobile robot is located, position errors may be reduced, and accordingly more accurate localization and mapping may be implemented. To this end, the vector field sensors 108 may have such properties as "continuity", "large spatial variation", and "small temporal variation". The continuity means that neighboring cells 304 or neighboring nodes 306 may be continuous and not discrete, and the large spatial variation means that variation of the vector field detected by the vector field sensors 108 may be large even when the mobile robot 100 moves a short distance. The small temporal variation means that an error at the time of detection by the vector field sensors 108 may be small. As the vector field sensor 108, a magnetic field sensor to detect a vector field created by the magnetic field formed through the earth, a Wi-Fi received signal strength indicator to detect a vector field created by a Wi-Fi signal, or an FM receiver may be used. A magnetic field is created between the North and South poles of the Earth approximately in the shape of a magnetic dipole. The direction and intensity of this magnetic field varies with position. Accordingly, by measuring the direction and intensity of the geomagnetic field with the vector field sensors 108 realized as magnetic sensors, the position of the mobile robot 100 in the vector field may be detected. In the case of the Wi-Fi received signal strength indicator or the FM receiver, the position of the mobile robot 100 in the vector field may be detected based on the size of a signal generated by a Wi-Fi repeater or an FM transmitter. While the Wi-Fi received signal strength indicator or the FM receiver may need a Wi-Fi repeater or an FM signal generator, the magnetic field sensor may use the geomagnetic field naturally created around the earth and thus may be relatively conveniently used without an additional device such as a signal generator.

Figure 4:
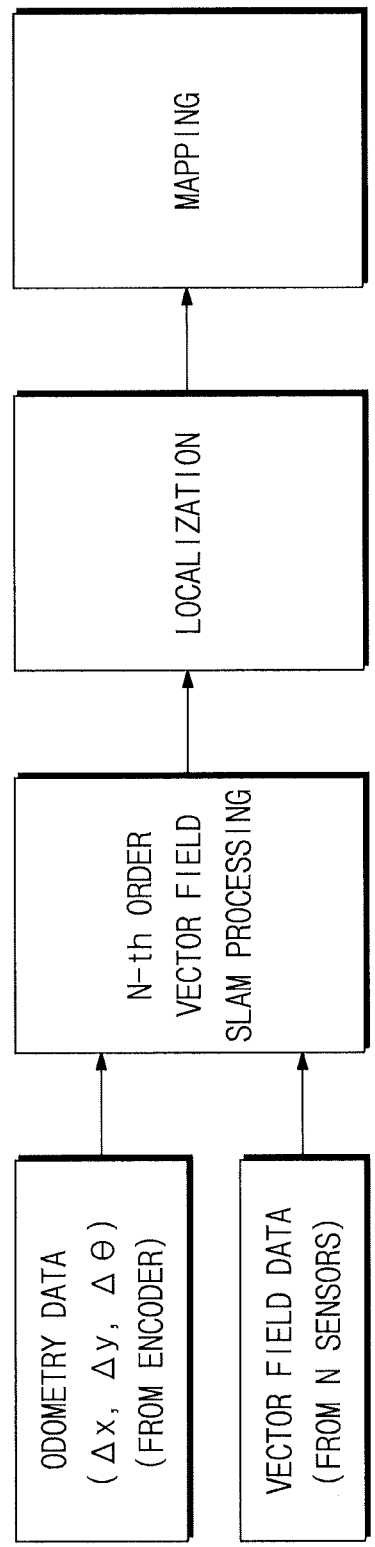
FIG. 4 is a view schematically illustrating localization and mapping performed by a mobile robot according to one or more embodiments, such as the mobile robot shown in FIG. 1.

FIG. 4 is a view schematically illustrating localization and mapping performed by a mobile robot according to one or more embodiments, such as the mobile robot shown in FIG. 1. As shown in FIG. 4, the controller 214 of the mobile robot 100 may receive information about movement of the electric wheels 218 from the encoder 206, thereby possibly acquiring the odometry data ($\Delta x$, $\Delta y$, $\Delta \theta$) of the mobile robot 100, and may receive vector field data for implementation of the vector field SLAM from plural (N) vector field sensors 108. Using the two groups of data, the controller 214 may update the information about the positions of the nodes 306 of the cells 304, may estimate the current position of the mobile robot 100. By accumulating the position information, the controller 214 may implement mapping.

Figure 5:
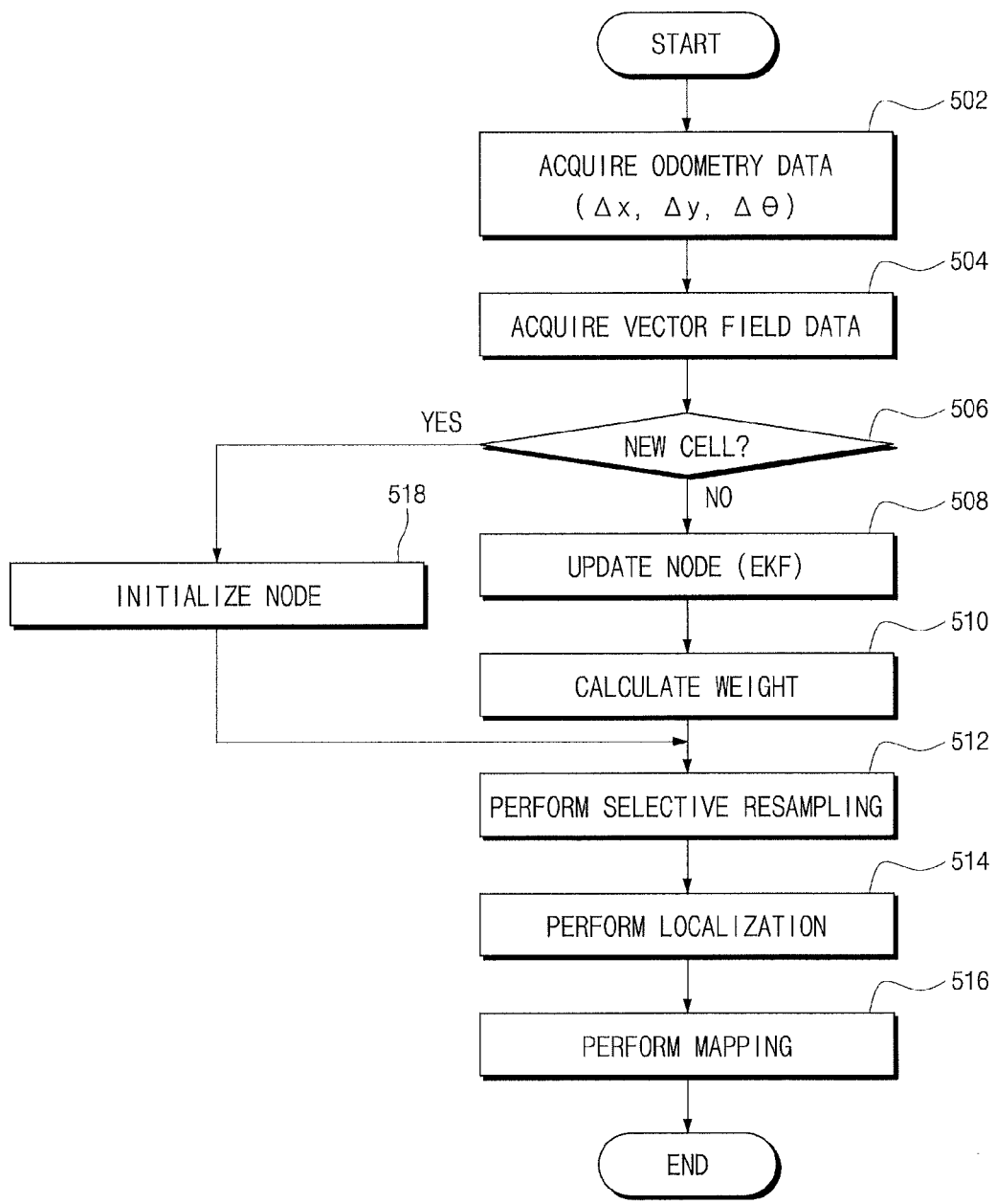
FIG. 5 is a view illustrating a method of controlling a mobile robot according to one or more embodiments.

FIG. 5 is a view illustrating a method of controlling a mobile robot according to one or more embodiments. The control method specifies the localization and mapping schematically described above with reference to FIG. 4. The control method may be implemented according to control by the controller 214 of the mobile robot 100.

The controller 214 may receive information about movement of the electric wheel 218 from the encoder 206, thereby possibly acquiring odometry data ($\Delta x$, $\Delta y$ and $\Delta \theta$) to estimate the current position of the mobile robot 100 (502). In addition, the controller 214 may receive vector field data for implementation of the vector field SLAM from the vector field sensors 108 (504).

At this time, in the case that the position of the mobile robot 100 changes in an existing cell 304 without movement of the mobile robot 100 from the cell 304 to another cell 304 (NO in operation 506), localization and mapping may be implemented through the processes of node updating 508, weight calculation 510, and selective resampling 512, which are described below.

First, in the node updating 508, the extended Kalman filter (EKF) for the mobile robot may be used to update the nodes. In the illustrated embodiment, an observation model necessary for application of the EKF may be created as described below. Bilinear interpolation for the k-th vector field datum of N vector field data acquired from the N vector field sensors 108 may be defined as Equation 1.

$$h_R^{(k)} = \begin{bmatrix} (s_x^{l1}\omega_1^{(k)} + s_x^{l2}\omega_2^{(k)} + s_x^{l3}\omega_3^{(k)} + s_x^{l4}\omega_4^{(k)})\cos x_3 + \\ (s_y^{l1}\omega_1^{(k)} + s_y^{l2}\omega_2^{(k)} + s_y^{l3}\omega_3^{(k)} + s_y^{l4}\omega_4^{(k)})\sin x_3 - \\ (s_x^{l1}\omega_1^{(k)} + s_x^{l2}\omega_2^{(k)} + s_x^{l3}\omega_3^{(k)} + s_x^{l4}\omega_4^{(k)})\sin x_3 + \\ (s_y^{l1}\omega_1^{(k)} + s_y^{l2}\omega_2^{(k)} + s_y^{l3}\omega_3^{(k)} + s_y^{l4}\omega_4^{(k)})\cos x_3 \\ s_z^{l1}\omega_1^{(k)} + s_z^{l2}\omega_2^{(k)} + s_z^{l3}\omega_3^{(k)} + s_z^{l4}\omega_4^{(k)} \end{bmatrix} \quad \text{Equation 1}$$

Figure 6:
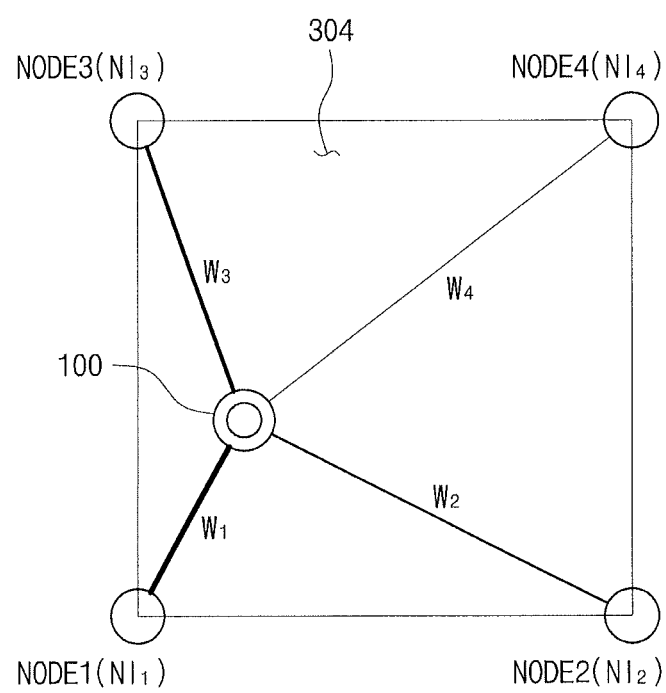
FIG. 6 is a view illustrating nodes configuring a cell in which a mobile robot according to one or more embodiments is positioned.

In Equation 1, x1, x2, and x3 respectively denote Δx, Δy, and Δθ of odometry data of the mobile robot. These elements of Equation 1 may be estimated as in Equation 2. Description of Equation 2 will be given with reference to FIG. 6. FIG. 6 is a view illustrating nodes configuring a cell in which a mobile robot according to one or more embodiments is positioned.

Weight for bilinear interpolation $$\omega_1^{(k)}(x_1^{(k)}, x_2^{(k)}) = \eta(n_{l_2,x} - x_1^{(k)})(n_{l_3,y} - x_2^{(k)})$$
$$\omega_2^{(k)}(x_1^{(k)}, x_2^{(k)}) = \eta(x_1^{(k)} - n_{l_2,x})(n_{l_3,y} - x_2^{(k)})$$
$$\omega_3^{(k)}(x_1^{(k)}, x_2^{(k)}) = \eta(n_{l_2,x} - x_1^{(k)})(x_2^{(k)} - n_{l_1,y})$$
$$\omega_4^{(k)}(x_1^{(k)}, x_2^{(k)}) = \eta(x_1^{(k)} - n_{l_1,x})(x_2^{(k)} - n_{l_1,x})$$
$$\eta = \frac{1}{(n_{l_2,x} - n_{l_2,x})(n_{l_3,x} - n_{l_1,x})}$$

Equation 2

Pose of the robot: $[x_1 \ x_2 \ x_3]^T$
Position of sensor k: $[x_1^{(k)} \ x_2^{(k)}]^T$
Signal value of node: $[s_x^{l_k} \ s_y^{l_k} \ s_z^{l_k}]^T$
Position of node $l_k$: $[n_{l_k,x} \ n_{l_k,y}]$ In Equation 2, the position of the mobile robot 100 may be a measured value estimated according to the odometry, and the position of a vector field sensor 108 denoted by 'k' may be a physical value associated with the vector field sensor 108 located at the mobile robot 100. For example, for a mobile robot 100 in the form of a circle with a radius of 200 mm, the center of the mobile robot may be defined as the origin (0, 0) in a coordinate system. In the case that the vector field sensor 108 is mounted to the edge of the mobile robot 100 (in the x-axis), the position of the vector field sensor 108 may be (200, 0). At this time, the coordinate (200, 0) is a physical value associated with the position of the vector field sensor 108. In Equation 1 and FIG. 6, the signal value s of node l is a vector field datum measured by the vector field sensor 108.

Equation 2 is given to indicate a correct position in a cell 304 as shown FIG. 6. x3 denotes rotational angle Δθ of the mobile robot, and thus suggests that conversion of the coordinate system has already been implemented. The four values given in Equation 2 denote the x-coordinate, y-coordinate, and z-coordinate of the mobile robot 100 at four nodes 1 to 4 in consideration of weights. The weights may be determined based on the position values of the nodes 1 to 4 and the position values of the vector field sensors 108. That is, as shown in FIG. 6, weights for nodes 1 to 4 may vary depending upon the position of the mobile robot 100 in the cell 304 (more specifically, the positions of the plural vector field sensors 108 of the mobile robot 100). In FIG. 6, the mobile robot 100 is closest to node 1, node 3 is the next closest node to the mobile robot 100, and nodes 2 and 4 are relatively far from the mobile robot 100. That is, the mobile robot 100 is positioned such that closeness of nodes 1 to 4 to the mobile robot 100 decreases in order of node 1→node 3→node 2→node 4. In this case, as can be seen from the thicknesses of lines connecting the mobile robot 100 with nodes 1 to 4, the greatest weight ω1 may be applied to node 1 closest to the mobile robot 100, weight ω3 may be applied to node 3 closest to the mobile robot 100 next to node 1, weight ω2 may be applied to node 2 closest next to node 3, and weight ω4 may be applied to node 4. The magnitude of the weight may decrease from ω1 to ω3 to ω2 to ω4.

For one position of the mobile robot 100, a plurality of vector field sensors 108 may exist. Accordingly, in the case that there are, for example, N vector field sensors 108, an observation model for the N vector field sensors 108 may be give as Equation 3.

$$h_R = \begin{bmatrix} h_R^{(1)} \\ \vdots \\ h_R^{(N)} \end{bmatrix} \quad \text{Equation 3}$$

To find the EKF, Jacobian of the observation model of Equation 3 may be needed. To this end, calculation may be performed as in the following Equation 4.

$$H_f = \frac{\partial h_R}{\partial s} = [H_{f_1} \ H_{f_2} \ \ldots \ H_{f_k}], \quad \text{Equation 4}$$

$$S = [\ S_x^{l1} \ S_y^{l1} \ S_z^{l1} \ S_x^{l2} \ S_y^{l2} \ S_z^{l2} \ \ldots \ S_x^{lk} \ S_y^{lk} \ S_z^{lk}\ ]$$

Figure 7:
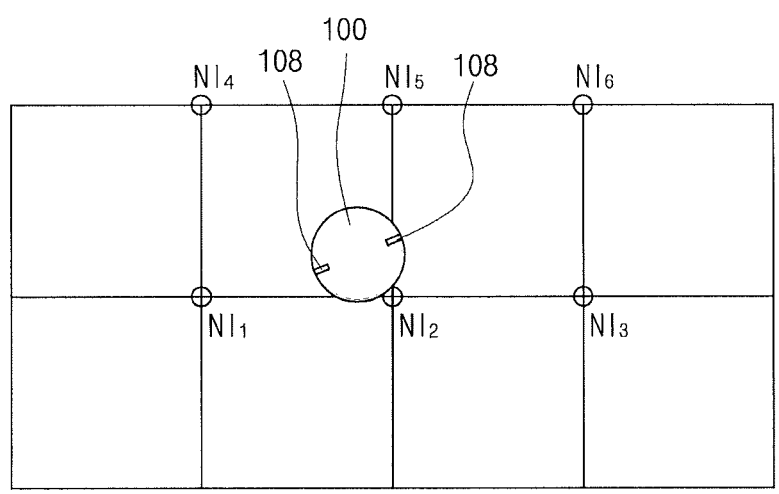
FIG. 7 is a view illustrating cells and nodes around a mobile robot according to one or more embodiments when the mobile robot moves from one cell to another.

In Equation 4, 11, 12, . . . , and lk denote all nodes (i.e., k observed landmarks) of the cells which the vector field sensors 108 of the mobile robot 100 reach as shown in FIG. 7. FIG. 7 is a view illustrating cells and nodes around a mobile robot according to one or more embodiments when the mobile robot moves from one cell to another. The Hf model estimated in Equation 4 may be applied to the EKF as in Equation 5.

$Q_t = H_f \Sigma_{t-1} H_f^T + R$: Innovation covariance matrix $K_t = \Sigma_{t-1} H_f Q_t^{-1}$: Kalman gain $\mu_t = \mu_{t-1} + K_t (z_t - \hat{z}_t)^T$: Landmark mean update $\Sigma_t = \Sigma_{t-1} - K_t H_f^T \Sigma_{t-1}$: Landmark covariance update   Equation 5

Again referring to FIG. 5, in the weight calculation 510, a weight reflecting an error between a measured value and a calculated value may be calculated in Equation 6 given below. The value obtained in Equation 6 may be used for selection in the selective resampling 512.

$$\omega_t = \frac{1}{\sqrt{|2\pi Q_t|}} \exp\left\{-\frac{1}{2}(z_t - \hat{z}_t)^T Q_t^{-1} (z_t - \hat{z}_t)\right\}, \quad \text{Equation 6}$$

$(z_t - z_t)$: Innovation

Figure 8:
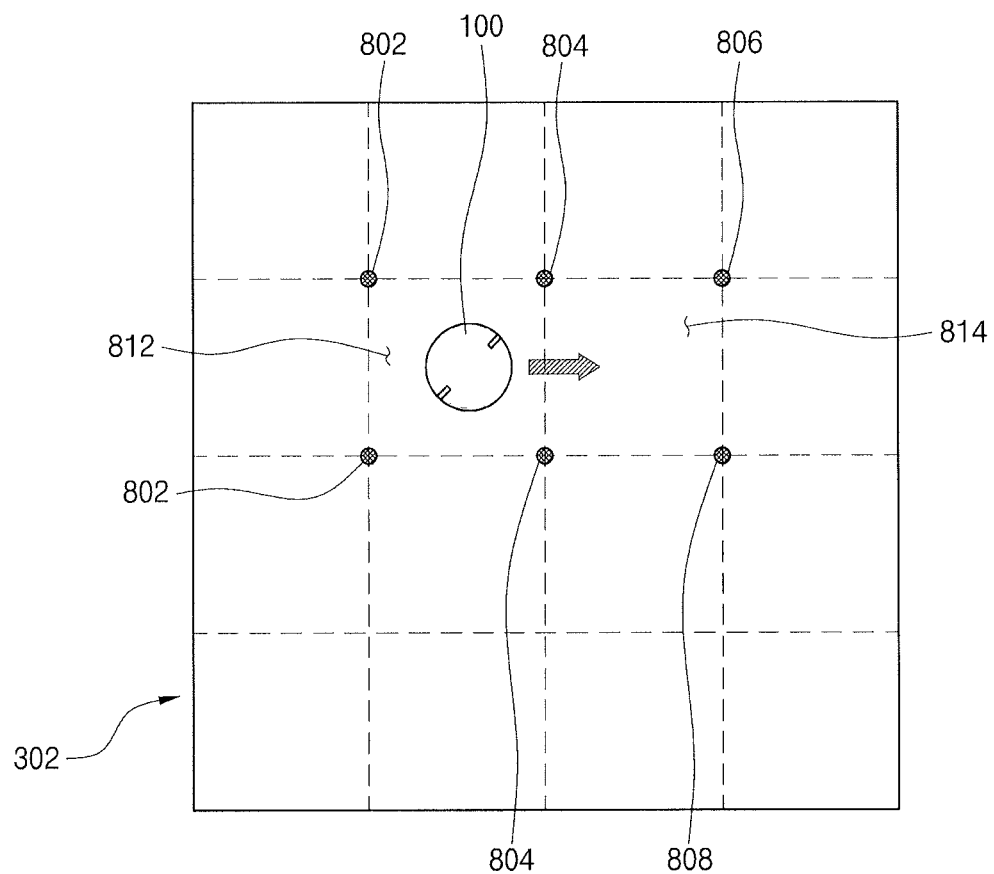
FIG. 8 is a view illustrating node initialization in a method of controlling a mobile robot according to one or more embodiments.

In the case that the mobile robot 100 moves from an existing cell 304 to another cell 304 (YES in operation 506), node initialization may be implemented (518). FIG. 8 is a view illustrating node initialization in a method of controlling a mobile robot according to one or more embodiments. As shown in FIG. 8, the mobile robot 100 may define a virtual cell through detection of a vector field while moving on a two-dimensional plane 302 (e.g., the surface of a floor) in a given space. Defining a cell may include specifying a plurality of nodes configuring the cell. In a cell (e.g., 812), the controller 214 of the mobile robot 100 may detect the size of a signal (e.g., the magnitude of a magnetic field) of nodes 802 and 804 configuring the cell 812 to estimate the positions of the nodes 802 and 804. While the mobile robot 100 moves to a neighboring cell 814 in this state, it may estimate the position thereof by producing weights for the nodes 804 and 806 for the cell 814, and the position of the node 802 of the existing cell 812 may be determined. At this time, the controller 214 of the mobile robot 100 may implement cell initialization by determining a value for initialization based on the mean value and covariance value of the node 804 connected to the node 806 and adding uncertainty in consideration of the size of the cells 812 and 814 and the characteristics of the vector field according to the number of the vector field sensors 108.

Subsequently, using the result of the vector field SLAM 506 to 512, the controller 214 may update the information about the positions of the nodes 306, may estimate the current position of the mobile robot 100 (514), may accumulate the information, and then may implement mapping of the surroundings of the mobile robot 100 (516). By producing weights for a plurality of nodes of a cell where the mobile robot 100 is positioned as above, accuracy of sensing of the position may be increased.

Figure 9:
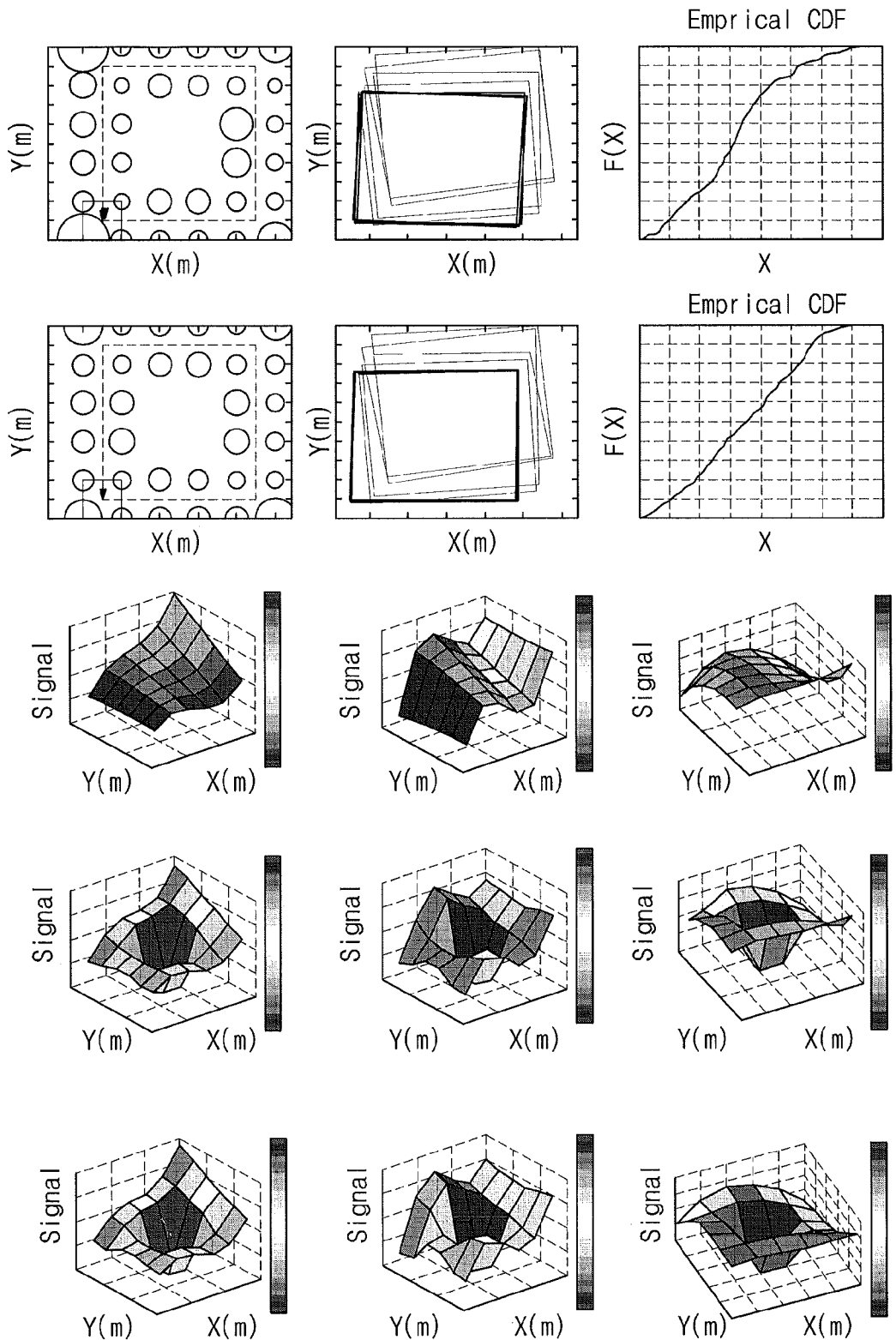
FIG. 9 is a view showing results of rectangular travel simulation for a mobile robot according to one or more embodiments.

FIG. 9 is a view showing results of rectangular travel simulation for a mobile robot according to one or more embodiments. Conditions for simulation shown in FIG. 9 are given below. In FIG. 9, the input field indicates values input through geomagnetic sensors employed as the vector field sensors 108. Since the geomagnetic sensor is a 3-axis sensor, three values are input therethrough.

σv=0.015 m/s (control noise), σR=0.5 (observation noise)
Speed: 0.3 m/s
5 round trips along a rectangular travel path
Cell size: 1 m×1 m
Installation spacing between vector field sensors: 0.35 m (two sensors installed at each of the front and the back)
Number of particles: 20

Figure 10:
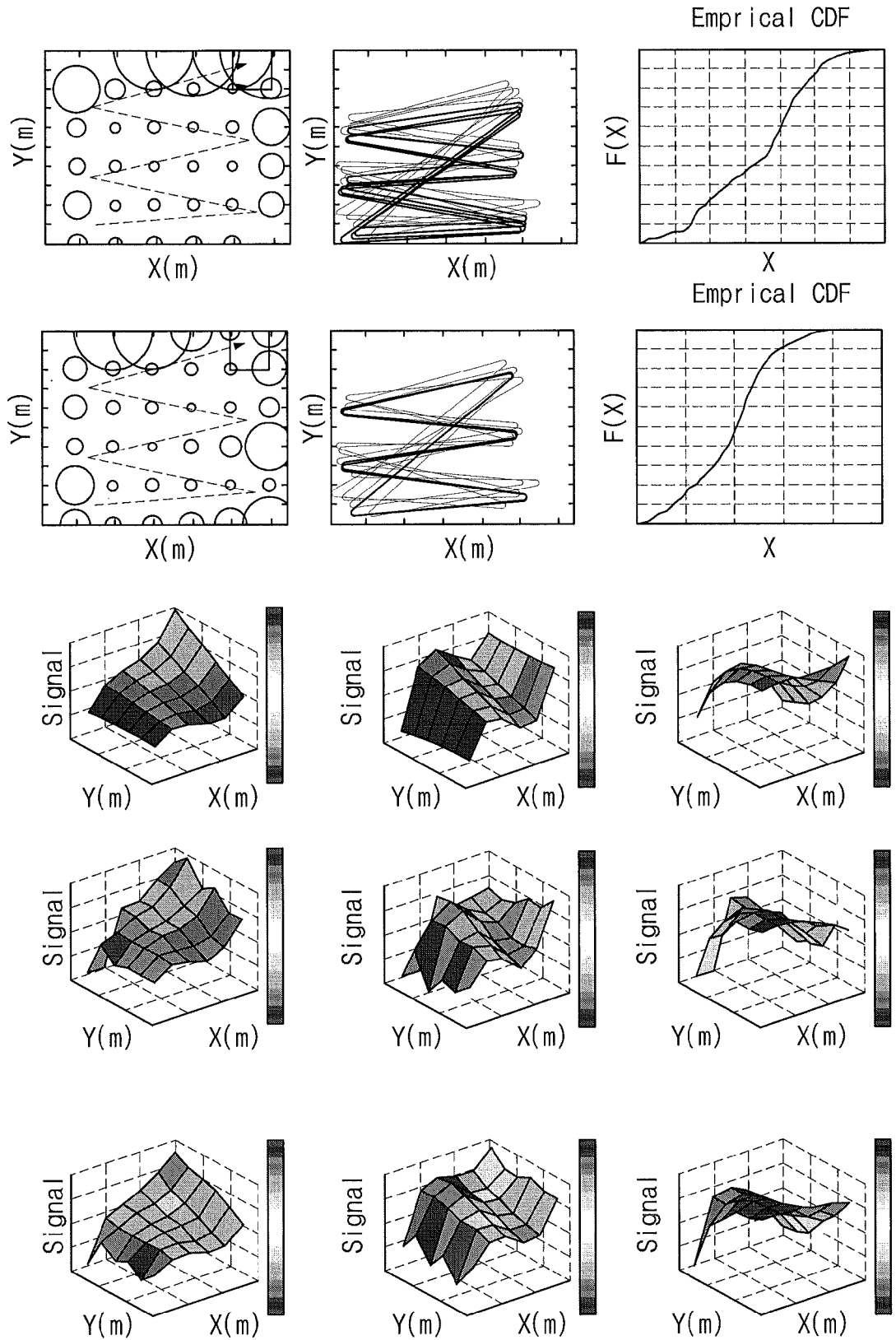
FIG. 10 is a view showing results of zigzag travel simulation for a mobile robot according to one or more embodiments.

FIG. 10 is a view showing results of zigzag travel simulation for a mobile robot according to one or more embodiments. Conditions for simulation shown in FIG. 10 are given below. In FIG. 10, the input field indicates values input through geomagnetic sensors employed as the vector field sensors 108. Since the geomagnetic sensor is a 3-axis sensor, three values are input there through.

σv=0.015 m/s (control noise), σR=0.5 (observation noise)
Speed: 0.3 m/s
5 round trips along a zigzag travel path
Cell size: 1 m×1 m
Installation spacing between vector field sensors: 0.35 m (two sensors installed at each of the front and the back)

The results of simulations shown in FIGS. 9 and 10 suggest that the maximum error may be reduced in the control method of the mobile robot according to one or more embodiments, compared to the conventional method, as shown in Table 1.

| Travel path | Method | Maximum error (m) | Precision (m) |
|---|---|---|---|
| Rectangular path | According to conventional art | 0.36 | 0.27 (90%) |
| | According to or more embodiments | 0.17 | 0.13 (90%) |
| Zigzag path | According to conventional art | 0.65 | 0.52 (90%) |
| | According to or more embodiments | 0.21 | 0.15 (90%) |

As is apparent from the above description, in localization and mapping of mobile robot according to one or more embodiments, more accurate localization and mapping may be implemented by producing a vector field using a plurality of sensors and utilizing the produced vector field.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodi-

What is claimed is:

1. A method of localization and mapping of a mobile robot comprising:
    acquiring a relative coordinate in a movement space using an encoder;
    acquiring an absolute coordinate in the movement space by detecting at least one of intensity and direction of a signal using a plurality of vector field sensors;
    defining a plurality of virtual cells on a surface of the movement space such that each of the cells has a plurality of nodes having predetermined positions; and
    updating position information about the plurality of nodes of at least one of the cells based on the relative coordinate acquired through the encoder and the absolute coordinate acquired through the vector field sensors and implementing localization and mapping in the movement space such that position information of a new node among the plurality of nodes is estimated while position information of a previous node among the plurality of nodes is determined.

2. The method according to claim 1, wherein the updating is performed when the mobile robot is positioned in one virtual cell among the plurality of virtual cells.

3. The method according to claim 2, further comprising calculating and applying weights for each of node among the plurality of nodes when the mobile robot is positioned in one virtual cell among the plurality of virtual cells.

4. The method according to claim 1, further comprising initializing a node among the plurality of nodes connected to another node among the plurality of nodes to be extended when the mobile robot moves from one virtual cell among the plurality of virtual cells to another virtual cell among the plurality of virtual cells.

5. The method according to claim 4, wherein the initializing is performed based on a mean value and a covariance value of the connected node.

6. The method according to claim 1, wherein the localization and mapping is performed by fast simultaneous localization and mapping (SLAM).

7. The method according to claim 1, further comprising compensating for an error of the relative coordinate acquired through the encoder using the absolute coordinate acquired through the plurality of vector field sensors.

8. The method according to claim 1, wherein the relative coordinate is an odometry coordinate comprising an x coordinate, a y coordinate and an angle of travel direction of the mobile robot.

9. The method according to claim 1, wherein the plurality of virtual cells have a continuity there between.

10. The method according to claim 9, wherein the plurality of nodes configuring each of the plurality of virtual cells have a continuity therebetween.

11. The method according to claim 1, wherein each of the plurality of vector field sensors is a magnetic field sensor.

12. The method according to claim 1, wherein each of the plurality of vector field sensors is a Wi-Fi received signal strength indicator.

13. The method according to claim 1, wherein each of the plurality of vector field sensors is an FM receiver.

14. The method according to claim 1, wherein at least two of the plurality of vector field sensors are arranged at a front and back of the mobile robot in a travel direction of the mobile robot.

15. A mobile robot comprising:
    an encoder to acquire a relative coordinate in a movement space;
    a plurality of vector field sensors to acquire an absolute coordinate in the movement space by detecting at least one of intensity and direction of a signal; and
    a controller to define a plurality of virtual cells on a surface of the movement space such that each of the cells has a plurality of nodes having predetermined positions and to update position information about the plurality of nodes of at least one of the virtual cells among the plurality of virtual cells based on the relative coordinate acquired through the encoder and the absolute coordinate acquired through the plurality of vector field sensors and implement localization and mapping in the movement space such that position information of a new node among the plurality of nodes is estimated while position information of a previous node among the plurality of nodes is determined.

16. The mobile robot according to claim 15, wherein the controller updates the position information about the plurality of nodes when the mobile robot is positioned in one virtual cell among the plurality of virtual cells.

17. The mobile robot according to claim 16, wherein the controller calculates and applies a weight for each node among the plurality of nodes when the mobile robot is positioned in one virtual cell among the plurality of virtual cells.

18. The mobile robot according to claim 15, wherein the controller initializes a node among the plurality of nodes connected to another node among the plurality of nodes to be extended when the mobile robot moves from one virtual cell the plurality of virtual cells to another virtual cell among the plurality of virtual cells.

19. The mobile robot according to claim 18, wherein initializing the connected node is performed based on a mean value and a covariance value of the connected node.

20. The mobile robot according to claim 15, wherein the localization and mapping is performed by applying fast simultaneous localization and mapping (SLAM).

21. The mobile robot according to claim 15, wherein the controller compensates for an error of the relative coordinate acquired through the encoder using the absolute coordinate acquired through the plurality of vector field sensors.

22. The mobile robot according to claim 15, wherein the relative coordinate is an odometry coordinate comprising an x-coordinate, a y-coordinate and an angle of travel direction of the mobile robot.

23. The mobile robot according to claim 15, wherein the plurality of virtual cells have a continuity therebetween.

24. The mobile robot according to claim 23, wherein the plurality of nodes configuring each of the plurality of virtual cells have a continuity therebetween.

25. The mobile robot according to claim 15, wherein each of the plurality of vector field sensors is a magnetic field sensor.

26. The mobile robot according to claim 15, wherein each of the plurality of vector field sensors is a Wi-Fi received signal strength indicator.

27. The mobile robot according to claim 15, wherein each of the plurality of vector field sensors is an FM receiver.

28. The mobile robot according to claim 15, wherein at least two of the plurality of vector field sensors are arranged at a front and back of the mobile robot in a travel direction of the mobile robot.

* * * * *

UNITED STATES PATENT AND TRADEMARK OFFICE
CERTIFICATE OF CORRECTION

PATENT NO. : 9,164,509 B2  Page 1 of 1
APPLICATION NO. : 14/190761
DATED : October 20, 2015
INVENTOR(S) : In Joo Kim et al.

It is certified that error appears in the above-identified patent and that said Letters Patent is hereby corrected as shown below:

In the Specification

Column 8, Lines 58-59

Delete "$(z_t - z_t)$" and insert -- $(z_t - \hat{z}_t)$ --, therefor.

Signed and Sealed this
Ninth Day of February, 2016

Michelle K. Lee
*Director of the United States Patent and Trademark Office*